United States Patent [19]

Gennetten

[11] 4,063,291
[45] Dec. 13, 1977

[54] APPARATUS AND METHOD FOR ENCODING AND DECODING DIGITAL INFORMATION

[75] Inventor: Edward W. Gennetten, San Diego, Calif.

[73] Assignee: The United States of America as represented by the Secretary of the Navy, Washington, D.C.

[21] Appl. No.: 732,566

[22] Filed: Oct. 15, 1976

[51] Int. Cl.² .................................................. G11B 5/09
[52] U.S. Cl. ........................................ 360/40; 360/51
[58] Field of Search ................. 340/347 DD; 360/51, 360/40, 41

[56] References Cited
U.S. PATENT DOCUMENTS

| | | |
|---|---|---|
| 3,815,108 | 6/1974 | McGrath et al. ...................... 360/41 |
| 3,905,029 | 9/1975 | McIntosh ............................... 360/41 |
| 3,968,328 | 7/1976 | Tsuchiya et al. ....................... 360/41 |

Primary Examiner—Vincent P. Canney
Attorney, Agent, or Firm—R. S. Sciascia; G. J. Rubens; H. Fendelman

[57] ABSTRACT

An encoding system wherein digital information comprising data, clock, and partitioning components is coupled to an encoding means comprising interconnected digital elements to generate a serial encoded signal having the encoded data, clock, and partitioning components inherent in the structure of the encoded signal. The encoded signal may be stored in a magnetic record-/reproduce system and subsequently coupled to a decoding means comprising interconnected digital elements to recover the data, clock, and partitioning components of the original digital information.

18 Claims, 6 Drawing Figures

APPARATUS AND METHOD FOR ENCODING AND DECODING DIGITAL INFORMATION

BACKGROUND OF THE INVENTION

The present invention pertains to a system for encoding and decoding digital information, and particularly to such a system wherein clock, data and partitioning information may be converted into a serial stream of coded binary bit periods and subsequently recovered.

A number of self clocking code systems, such as the Manchester code, are generally well known for encoding digital information comprising a data component and a clock component in the form of an encoded signal which comprises a serial stream of binary coded bit periods. An important application for such an encoding system is the storage of digital information on a medium, such as magnetic tape, and its subsequent recovery, wherein the use of separate data and clock channels may be disadvantageous for various reasons. In a common form of the Manchester code, each uncoded logic 1 bit period is defined in the encoded signal by a negative transition in the middle of a coded bit period, and each uncoded logic 0 bit period is defined in the encoded signal by a positive transition in the middle of a coded bit period. The complementary form of the above Manchester code may also be used, wherein uncoded logic 1's are defined in the encoded signal by positive transitions, and logic 0's are defined in the encoded signal by negative transitions.

If the data component of digital information to be encoded in a self-clocking code system comprises discrete data bit sets, it may be necessary to include partitioning information in the encoded signal to separate, or partition, some or all of the data bit sets from other data bit sets. As is well known, such partitioning information is very important where encoded signals are subject to indeterminate interruptions, for example, where an encoded signal is stored on magnetic tape subject to indeterminate start/stop operations. Such partitioning information is also very important in decoding an encoded signal in which time base instabilities and spurious transitions have been induced. According to conventional practice, a self-clocking code such as the Manchester code may provide separation information by employing a partitioning code comprising a selected number of partitioning bit periods having a selected combination of logic levels. The bits of the partitioning code are inserted into a sequence of uncoded data bit periods following a selected data bit set, encoded in the manner of the data bit periods, and subsequently decoded to separate the selected data bit set. In a Manchester encoded signal, according to the above conventional practice, each uncoded partitioning bit period is represented by a transition in the middle of a coded bit period, whereby it may be indistinguishable from encoded data.

Employment of such partitioning codes to partition encoded data bit sets generally requires a relatively complex circuitry both to insert the partitioning code into the data bit sequence before encoding, and to detect the presence of the partitioning code after decoding. In addition, in some applications the number of bits in a partitioning code may be large compared to the number of bit periods in the data bit sets. Consequently, the data density of the encoded signal, the number of coded bit periods per unit of time which represent data information, is significantly reduced. In applications where it is necessary to maximize the amount of data information stored on a magnetic medium, the use of conventional partitioning codes to separate data bits may be undesirable.

SUMMARY OF THE INVENTION

The present invention discloses a system for encoding and decoding digital information in an encoded signal comprising a serial stream of binary coded bit periods, the digital information comprising a data component, an associated clock component, and a partitioning component which partitions selected sets of data bit periods, and the invention generally comprises an encoding means, a decoding means, and an interconnecting serial channel means. Encoding means may comprise, though is not limited to, the interconnection of two selected digital elements which receives the digital information to be encoded and generates the encoded signal, wherein each uncoded logic 1 data bit period is defined in a coded bit period by a transition to a predetermined logic level, and each uncoded logic zero data bit period is defined in a coded bit period by a transition to the other logic level. The partitioning of a selected set of data bits is defined in the encoded signal by a blank interval comprising one or more coded bit periods held at a predetermined logic level, which follows the coded bit periods which define the selected data bit set. Each blank interval in the encoded signal is followed by a synchronizing interval comprising one or more coded bit periods, each of which contains a transition to a predetermined logic level, for differentiating between transitions in the coded bit periods which define data, and transitions occurring on the edges of the coded bit periods.

By encoding the digital information in the above manner, the encoded partitioning information as well as the encoded clock and data is inherent in the structure of the encoded signal which, as far as is known, is not implemented in any conventional encoding system. It may be noted that by limiting the width of each blank interval and each synchronizing interval to one coded bit period, no more than two coded bit periods are required to both partition and synchronize any selected data bit set.

A decoding means for the invention may comprise, though is not limited to, a novel interconnection of standard digital elements which receives the encoded signal and generates a first, a second, and a third output which comprise respectively, the data, clock and partitioning components of the original digital information. A serial channel means may comprise, though is not limited to, a magnetic record/reproduce system such as a tape recorder.

The invention herein disclosed may alternatively be embodied in the form of a method comprising the steps of (1) encoding digital information to provide an encoded signal having the structure previously described, (2) serially channeling the encoded signal to a selected location, and (3) decoding the encoded signal at the selected location to recover the original digital information.

OBJECTS OF THE INVENTION

It is an object of the present invention to provide a new and improved means and method for encoding and decoding digital information comprising data, clock and partitioning information in an encoded signal comprising a serial stream of binary coded bit periods.

Another object of the invention is to provide a new and improved apparatus and method for encoding and decoding digital information comprising data, clock and partitioning information in an encoded signal wherein the encoded data, clock, and partitioning information are all inherent in the structure of the encoded signal.

Another object of the invention is to provide a new and improved apparatus and method for encoding and decoding digital information comprising data, clock and partitioning information in an encoded signal wherein the amount of data encoded per unit time is maximized.

Another object of the invention is to provide a new and improved apparatus and method for partitioning and resynchronizing digital information decoded from an encoded signal subject to time base instabilities and spurious transitions.

Another object of the invention is to provide a new and improved apparatus and method for partitioning and resynchronizing digital information decoded from an encoded signal which may have been subject to indeterminate interruptions, such as where an encoded signal is stored on a magnetic tape subject to indeterminate start/stop operations.

Another object of the invention is to provide a new and improved apparatus and method for minimizing the number of coded bit periods required to partition a set of data bits encoded in a Manchester form.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figure 1:
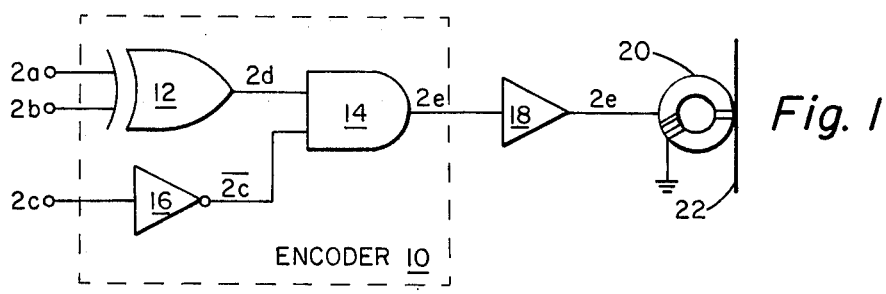
FIG. 1 is a schematic diagram showing an encoder for an embodiment of the invention coupled to a magnetic recording means.
Figure 2:
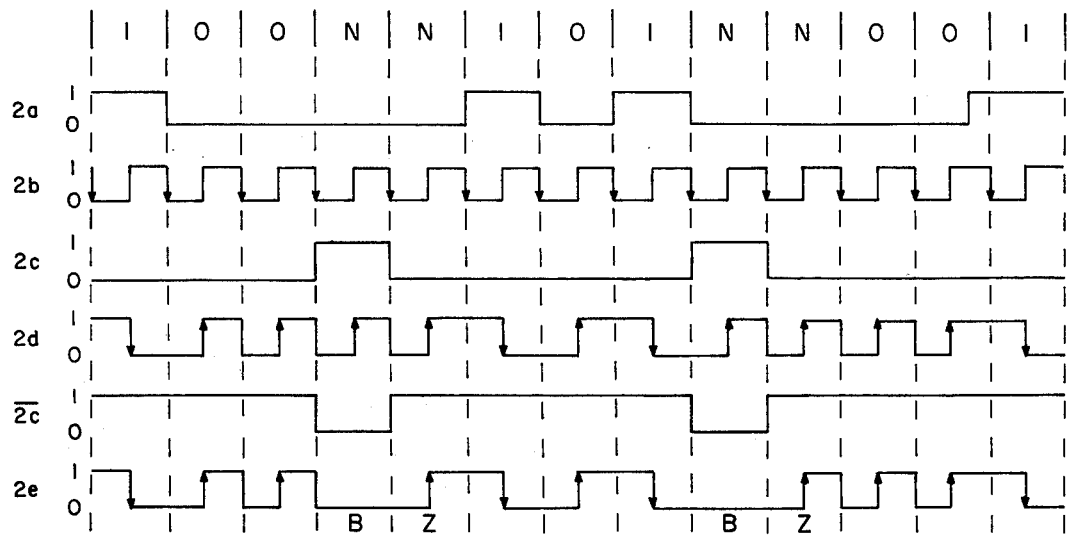
FIG. 2 shows a series of waveforms useful in understanding FIG. 1.

Referring to FIG. 1, there is shown encoder 10 comprising standard interconnected digital elements, and referring also to FIG. 2 there are shown waveforms comprising the respective inputs and outputs of the digital elements of encoder 10, each referenced input or output of the respective digital elements of encoder 10 corresponding to the same referenced waveform of FIG. 2. Waveforms 2a, 2b, and 2c show the data, clock and partitioning components, respectively, of digital information to be encoded by encoder 10 in a serial encoded signal. The data component shown in 2a comprises sequential data bit sets 100, 101, and, 001, each set being separated by two null bit periods, NN, the width of each data bit period and null bit period being determined by the period of the clock component shown in waveform 2b. While waveform 2a shows three-bit data bit sets, it is to be understood that the present invention could be employed to encode a sequence of data bit sets comprising any number of data bits having any combination of logic levels and which are separated by any number of null bit periods. The partition of each data bit set of waveform 2a is defined by a partitioning pulse, shown in waveform 2c, which has an interval of one clock period.

The data component shown in waveform 2a and the clock component shown in waveform 2b provide the inputs to exclusive OR gate 12, which has a logic 1 output only when one and only one of its inputs is at logic 1. Consequently, the output of exclusive OR gate 12, shown in waveform 2d, comprises a signal wherein each of the data bit periods and null bit periods are represented in the form of a conventional Manchester code, the Manchester representation of each null bit period being indistinguishable from the representation of a logic zero data bit.

The output of exclusive OR gate 12 provides an input to AND gate 14, the other input to AND gate 14 comprising complementary partitioning pulses, shown in waveform $\overline{2c}$, which are derived by coupling the partitioning component of waveform 2c through inverter 16. The output of AND gate 14, shown in waveform 2e, is an encoded signal comprising a serial stream of coded bit periods, wherein each uncoded logic 1 data bit period is defined by a negative transition in the middle of a coded bit period, each uncoded logic 0 bit period is defined by a positive transition in the middle of a coded bit period, and each partitioning pulse of the partitioning component is defined by a blank interval B, or coded bit period remaining at logic 0. Each blank interval is followed by a synchronizing interval, Z, a coded bit period in which a positive transition occurs.

The encoded signal shown in waveform 2e is coupled from AND gate 14 to line driver 18, which amplifies the encoded signal and couples it to magnetic recording means 20, which may be a magnetic recording head situated in recording relationship to a magnetic medium 22 such as a magnetic tape, whereby the encoded signal of waveform 2e may be stored for an indefinite length of time. Alternatively, the encoded signal may be coupled into any other suitable serial channel or employed for any other suitable purpose.

Figure 3:
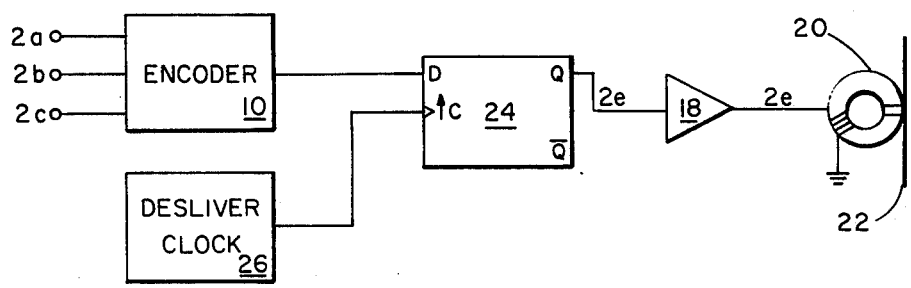
FIG. 3 is a block diagram showing a desliver circuit coupled to the encoder of FIG. 1.

Referring to FIG. 3, there is shown encoder 10 coupled to line drive 18 through desliver circuit 24. As is well known in the art, when the data and clock components shown in waveforms 2a and 2b are applied to the input terminals of an actual physical device used for exclusive OR gate 12, spurious transitions may be generated within exclusive OR gate 12, whereby spikes or slivers may appear in the output of encoder 10. By coupling the output of encoder 10 to desliver circuit 24, which may comprise a standard "D" flip-flop connected as shown and which is clocked by desliver clock 26, the slivers will be removed to obtain the idealized encoded signal shown in waveform 2e. Desliver clock 26 may comprise any suitable clock means generating a clock signal having twice the frequency of the clock component shown in waveform 2b, and a phase difference.

Figure 4:
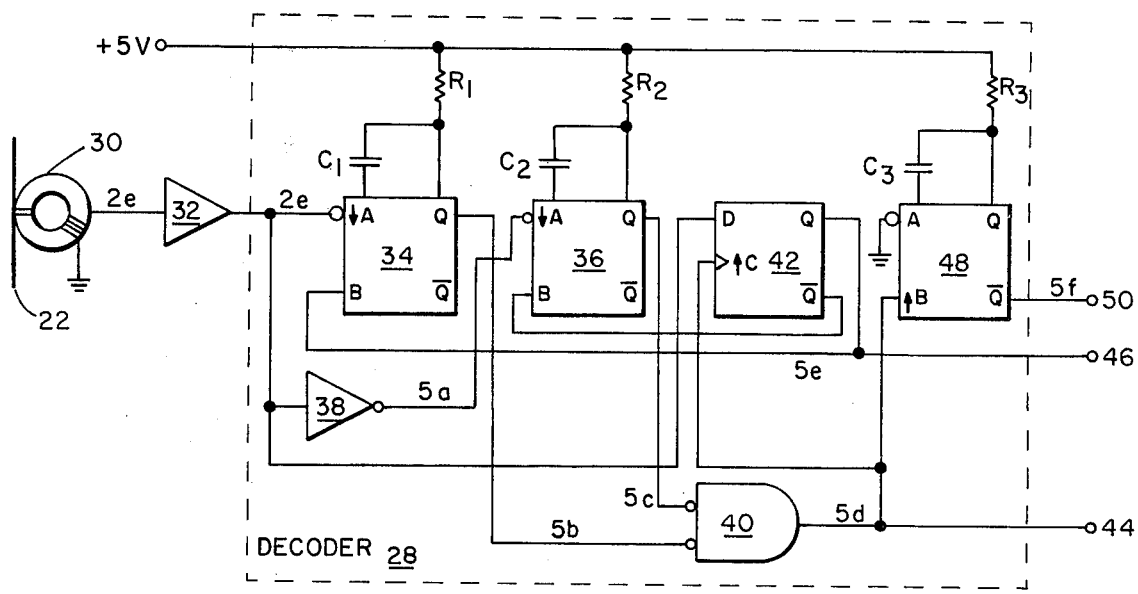
FIG. 4 is a schematic diagram showing a decoder for an embodiment of the invention coupled to a magnetic reproduction means.
Figure 5:
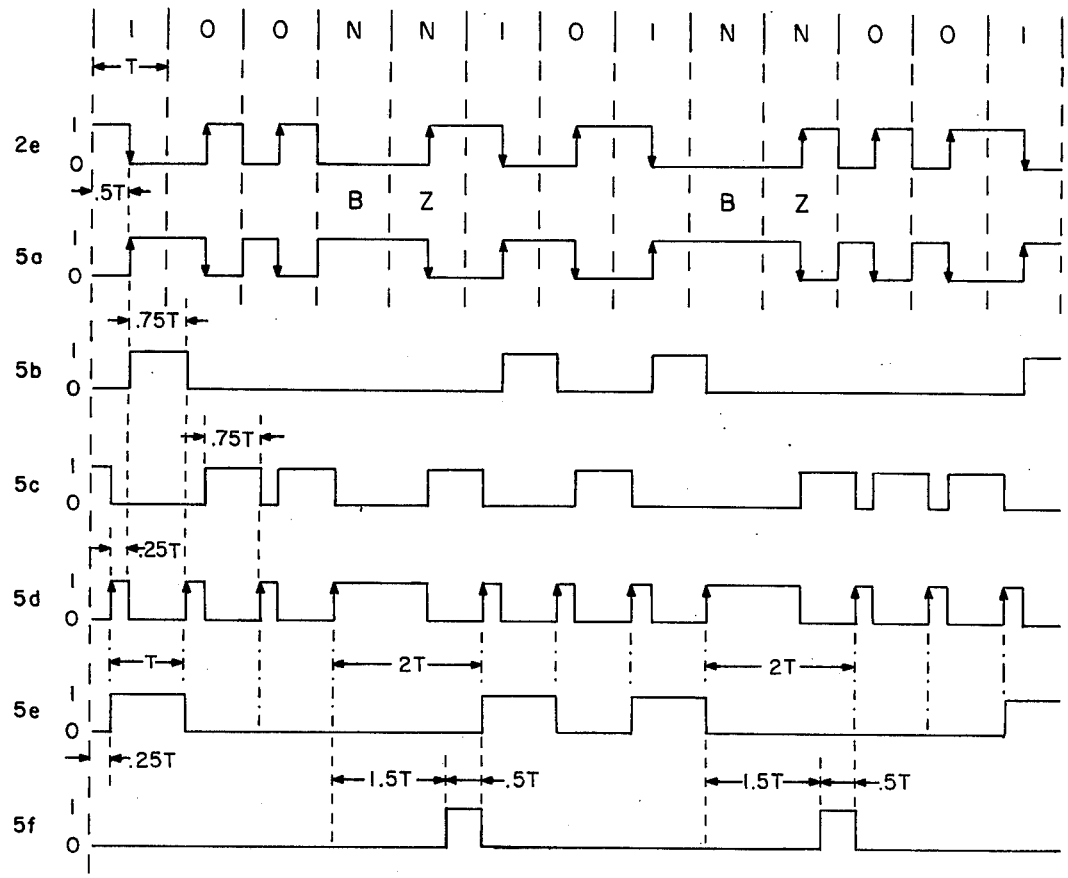
FIG. 5 shows a series of waveforms useful in understanding FIG. 4.

Referring to FIG. 4 there is shown decoder 28 comprising standard interconnected digital elements, and referring to FIG. 5 there are shown waveforms comprising the respective inputs and outputs of the digital elements of decoder 28, each referenced input or output of an element of decoder 28 corresponding to the same referenced waveform of FIG. 5. The input to decoder 28 comprises the encoded signal shown in waveform 2e of FIG. 5, which is the same waveform 2e of FIG. 2, and may be coupled to decoder 28 from magnetic reproduction means 30, which may comprise a magnetic reproduction head in reproduction relationship to magnetic medium 22, through line receiver 32 which amplifies the encoded signal. Alternatively, the encoded signal may be coupled to decoder 28 from any other suitable serial channel.

The encoded signal, which is shown in waveform 2e of FIG. 5 to have a period T, is coupled into both sides of a loop, one side comprising non-retriggerable monostables 34 and 36, inverter 38, and NOR gate 40 and the other side comprising edge-triggered "D" flip-flop 42. Each of the monostables 34 and 36 is a standard digital element which is biased by a 5 volt source through its RC network, $R_1C_1$ or $R_2C_2$, respectively, and has the characteristic that a negative transition at its "A" terminal triggers a logic 1 pulse for a time interval determined by its RC constant if it is enabled by a logic 1 at its "B" terminal. The duration of the output pulses of the non-retriggerable monostables remains unaffected by subsequent transitions at their "A" terminals. "D" flip-flop 42, which must be an edge-triggered flip-flop, is a well-known device and has the characteristic that its output Q follows its input each time it is clocked by a transition at its clock terminal. The inverted output $\overline{Q}$ follows as the complement of the output Q. Flip-flop 42 is clocked by the output of NOR gate 40, and monostables 34 and 36 are enabled by the logic 1's coupled to their "B" terminals from the output and inverted output, respectively, of flip-flop 42, whereby digital elements of the loop interact to recover both the data and clock components of the original digital information, in a manner hereinafter described.

Each coded bit period of waveform 2e defining an uncoded logic 1 data bit period couples a negative transition to the "A" terminal of monostable 34, whereupon monostable 34 generates a positive pulse, having been enabled at its "B" terminal by a logic 1 level fed back from the output $\overline{Q}$ of flip-flop 42. Each coded bit period defining an uncoded logic 0 data bit period couples a positive transition to inverter 38, whereupon a negative transition is coupled to the "A" terminal of monostable 36, as shown by waveform 5a. In response, monostable 36 generates a positive pulse, having been enabled at its "B" terminal by a logic 1 level fed back from the inverted output Q of flip-flop 42. The output pulses of monostable 34, shown in waveform 5b, may usefully have intervals of 0.75T by appropriate selection of $R_1C_1$, and are coupled to an input of NOR gate 40. The output pulses of monostable 36, shown in waveform 5c, may similarly have intervals of 0.75T and are coupled to the other input of NOR gate 40.

Waveform 5d, which shows the output of NOR gate 40, illustrates that by selecting the width of output pulses of monostable 34 and 36 to be less than T, clock pulses of the original clock component are recovered and coupled to decoder output terminal 44. To recover the original data component, flip-flop 42 is clocked by the positive transitions of the clock pulses, whereby the output of flip-flop 42, coupled to decoder output terminal 46, comprises a sequence of data bit periods, which are shown in waveform 5e to be identical to the data bit periods of the original data component. The recovered data bits have a width T and a phase delay with respect to the original data component.

The recovered clock pulses are also used to recover the partitioning component of the original digital information by coupling the output of NOR gate 40 to the "B" terminal of retriggerable monostable 48, which is biased from a 5 volt source through its RC network $R_3C_3$, the "A" terminal of monostable 48 being connected to ground. Monostable 48 is a standard digital element and, connected as shown, has the characteristic that a positive transition at its "B" terminal triggers a logic 1 pulse from its output Q for a time interval determined by its RC constant, unless a subsequent positive transition is coupled to its "B" terminal before the end of the time interval, whereupon its output Q remains at logic 1. The inverted output $\overline{Q}$ of monostable 48 shown in waveform 5f, is coupled to decoder output terminal 50. Consequently, by selecting a value of $R_3C_3$ to provide monostable 48 with a fixed pulse width of 1.5T, inverted output $\overline{Q}$ of monostable 48 is held at logic 0 by the recovered clock pulses shown in waveform 5d until an interval of 2T occurs between clock pulses, whereupon inverted output $\overline{Q}$ rises to logic 1. The 2T interval results from the presence of a blank interval B in the encoded signal of waveform 2e. At 0.05T after inverted output $\overline{Q}$ rises to logic 1, it falls back to logic 0 in response to the synchronizing interval Z of the encoded signal, which recommences the clock pulses and synchronizes them with the data following thereinafter.

By comparing waveforms 5e and 5f, it may be noted that the 0.05T logic 1 level of monostable 48 occurs between partitioned data bit sets and therefore comprises the partitioning component of the original digital information.

Figure 6:
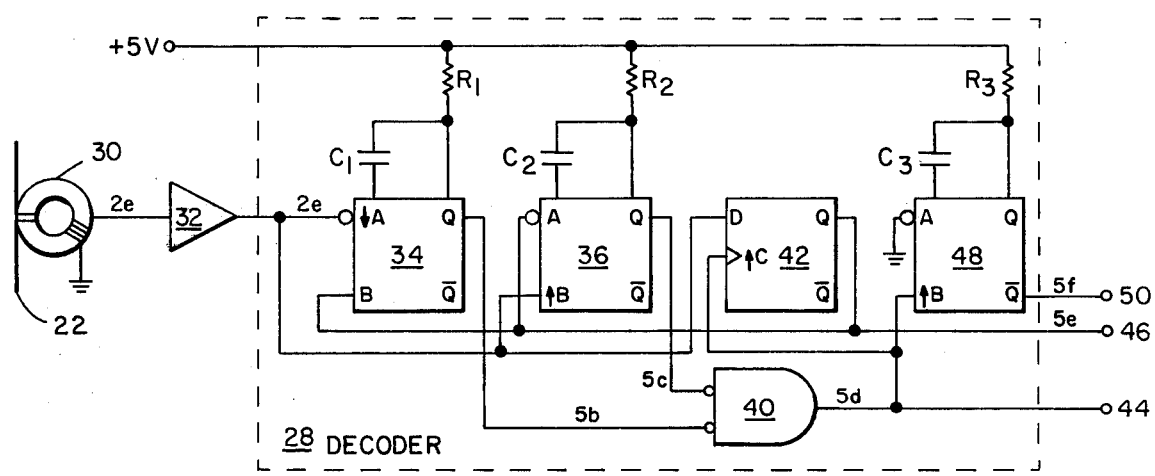
FIG. 6 shows a modification of the decoder of FIG. 4.

Referring to FIG. 6 there is shown a modification of decoder 28 wherein certain interconnections between selected digital elements are changed whereby inverter 38 is no longer needed for the operation of decoder 28. It may be noted that in this modification monostable 36 is triggered by positive transitions coupled to its "B" terminal and is enabled by a logic 0 level at its "A" terminal.

Obviously many modifications and variations of the present invention are possible in the light of the above teachings. It is therefore to be understood that within the scope of the appended claims the invention may be practiced otherwise than as specifically described.

What is claimed is:

1. An apparatus for encoding and decoding digital information comprising data, clock and partitioning components, said apparatus comprising:
encoding means for receiving said digital information and for encoding said data, clock and partitioning components in an encoded signal comprised of a serial stream of coded bit periods wherein each of said encoded components is inherent in the structure of said encoded signal, wherein said data component comprises discrete sets of sequential data bit periods, wherein each uncoded logic 1 data bit of said sequence is defined in said encoded signal by a transition to a predetermined logic level in one of said coded bit periods and each uncoded logic 0 data bit of said sequence is defined in said encoded signal by a transition of the other logic level in one of said coded bit periods, and wherein said partitioning component of said digital information is defined in said encoded signal by a blank interval occurring during a selected number of adjacent coded bit periods during which blank interval no transitions to a predetermined logic level occur; and said apparatus further comprising decoding means coupled to said encoding means for receiving said encoded signal and responding thereto by generating a first output comprising said data component, a second output comprising said clock component, and a third output comprising said partitioning component.

2. The apparatus of claim 1 wherein said encoding means comprises:
an exclusive OR gate having first and second inputs for receiving respectively, said data and clock components;
partition pulse means for providing an output that is derived from said partition component; and
an AND gate having inputs operably coupled to the respective outputs of said exclusive OR gate and to said partition pulse means.

3. The apparatus of claim 1 wherein said encoding means and said decoding means are coupled together by means of a serial channel means.

4. The apparatus of claim 3 wherein said encoding means and said decoding means each comprise selected interconnected digital elements.

5. The apparatus of claim 4 wherein said encoding means comprises two interconnected logic gates coupled to said serial channel means through a deslivering means.

6. The apparatus of claim 4 wherein the digital elements comprising said decoding means include:
a first non-retriggerable monostable operably coupled to a source of said encoded signal;
a second non-triggerable monostable operably coupled to a source of the complement of said encoded signal;
a NOR gate operably coupled to outputs of said first and second non-retriggerable monostables;
an edge triggered flip-flop operably coupled to the output of said NOR gate; and
a retriggerable monostable operably coupled to the output of said NOR gate.

7. The apparatus of claim 6 wherein said serial channel means comprises a record/reproduce system.

8. The apparatus of claim 1 wherein each of said data-defining transitions in said encoded signal occurs in the middle of one of said coded bit periods.

9. The apparatus of claim 1 wherein each of said blank intervals is followed in said encoded signal by a synchronizing interval comprising a selected number of adjacent coded bit periods in which transitions to a predetermined logic level occur.

10. The apparatus of claim 9 wherein each of said blank intervals and each of said synchronizing intervals comprises one of said coded bit periods of said encoded signal.

11. In an apparatus including first means for generating a Manchester-type code characterized by a self clocking encoded signal having data and clock components on the same waveform, wherein said data component comprises discrete sets of sequential data bit periods, wherein each logic 1 and logic 0 of said data is recognizable on said waveform as either a negative or a positive transition in one of said bit periods, the improvement comprising:
second means operably coupled to said first means for generating a partition signal inherent on said waveform and recognizable as a blank interval occurring during at least one of said bit periods during which blank interval no transitions to a predetermined logic level occur.

12. The apparatus of claim 11 wherein the improvement further comprises:
said second means being interconnected with said first means such that in said encoded signal, each of said blank intervals is followed by a synchronizing interval comprising at least one coded bit period in which a transition to a predetermined logic level occurs.

13. The apparatus of claim 11 further including:
decoding means operably coupled to said first and second means for receiving said encoded signal and responding thereto by generating a first output comprising said data component, a second output comprising said clock component and a third output comprising said partition signal.

14. A method for encoding and decoding digital information comprising data, clock, and partitioning components, said method comprising the steps of:
a. encoding said data, clock, and partitioning components of said digital information in an encoded signal wherein each of said encoded components is inherent in the structure of said encoded signal, wherein said data component comprises discrete sets of sequential data bit periods, wherein each uncoded logic 1 data bit of said sequence is defined in said encoded signal by a transition to a predetermined logic level in one of said coded bit periods and each uncoded logic 0 data bit of said sequence is defined in said encoded signal by a transition to the other logic level in one of said coded bit periods, and wherein said partitioning component of said digital-information is defined in said encoded signal by a blank interval occurring during at least one coded bit period during which blank interval no transitions to a predetermined logic level occur;
b. decoding said encoded signal to recover said data component, said clock component and said partitioning component of said digital information.

15. The method of claim 14 wherein said encoded signal comprises a serial stream of coded bit periods.

16. The method of claim 14 wherein each of said blank intervals of said encoded signal is followed by a synchronizing interval comprising at least one coded bit period in which transitions to a predetermined logic level occur.

17. The method of claim 16 wherein said step of encoding and said step of decoding are accomplished by means of selected interconnected digital elements.

18. The method of claim 17 wherein said encoded signal is stored on a magnetic medium after said step of encoding and before said step of decoding.

* * * * *